I. F. WILLIAMS.
MATS.
No. 174,883.                     Patented March 14, 1876.
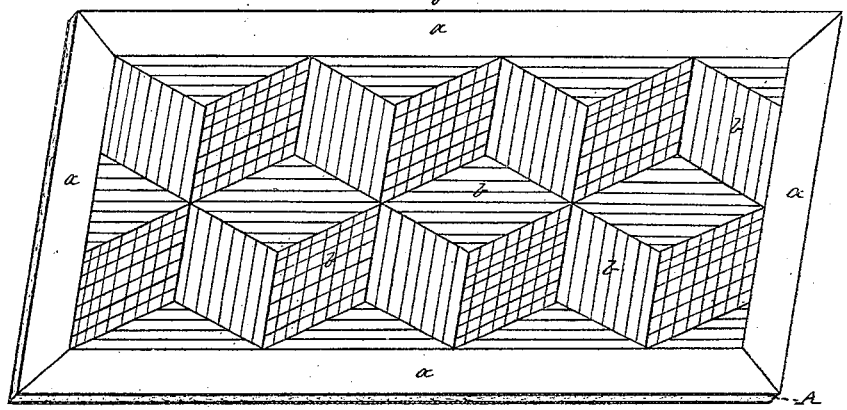
WITNESSES                                          INVENTOR

UNITED STATES PATENT OFFICE.

ISAAC F. WILLIAMS, OF BRISTOL, RHODE ISLAND.

IMPROVEMENT IN MATS.

Specification forming part of Letters Patent No. 174,883, dated March 14, 1876; application filed January 25, 1875.

*To all whom it may concern:*

Be it known that I, ISAAC F. WILLIAMS, of the town of Bristol, in the county of Bristol and State of Rhode Island, have invented a certain new and useful Mat; and I do hereby declare that the following specification, taken in connection with the drawings furnished, and forming a part of the same, is a clear, true, and accurate description thereof.

My invention consists in a mat for floors, tables, desks, &c., composed of a foundation of vulcanized caoutchouc, (or a compound in which that or a similar gum is the adhesive agent,) and one or more wearing-surfaces, made up of numerous pieces of textile fabric, which are arranged with relation to each other, after the manner of inlaying, as in marquetry, and united to the foundation by vulcanization. Mats manufactured in accordance with my invention are durable and neat, and, owing to the fact that the wearing-surfaces resemble inlaid work, they are very attractive in appearance. They can be made at low cost, because the wearing-surfaces (although they may be composed of fine and expensive fabrics) are made up of small pieces, incident to the manufacture of rubber clothing, &c., which are thus utilized instead of consigning them to "scrap," as is usually the case.

In the drawings, Figure 1 represents in perspective one style of mat embodying my invention. Fig. 2 represents the same in longitudinal section, slightly enlarged.

A denotes the foundation of the mat. It may be composed of any of the well-known vulcanizable compounds of which caoutchouc forms a prominent element. I prefer to mix therewith a liberal proportion of ground scrap or waste, not only as an economical measure, but also because the fibrous matter usually forming a part of such scrap is well suited for giving the desired bulk and gives the mat considerable tensile strength. The mat shown is represented as being composed of the rubber foundation, and two surfaces made up of pieces of woolen cloth after the manner of inlaying, the border *a* being of one color, for instance, and the several lozenge-shaped pieces *b* of various colors. These pieces are all coated with gum on one side and laid upon the rubber foundation prior to vulcanization, and by that process are firmly united thereto. Mats of this kind are very economically made, because the cloth surfaces are composed mainly of cuts from scraps, which plentifully abound in rubber-works where a variety of goods are made, and the labor can be economically executed. Small mats for tables and desks constructed in this manner may be made very attractive to the eye and possess great durability. Both surfaces may be made up in like manner, but involving different colored cloths and style of ornamentation, so that by an occasional reversal of surfaces an agreeable change may be made with a single mat. When it is desirable to secure to the inlaid styles extraordinary durability, a thread of unvulcanized gum may be applied between the pieces after they have been closely laid, by slightly separating them in bending the mat. After vulcanization all the edges of the pieces will be firmly cemented to each other, and a net-work of gum will be also formed, slightly raised above the surface of the fabric. According to the nature of the intended use, the mats will be provided with one or both surfaces of textile fabric. After long wear and usage, although these mats may in a great measure lose their attractive features, they will continue to be practically serviceable, because the exterior fabrics are so firmly held by the rubber foundation that they will afford a comparatively effective surface.

I am aware that it is not broadly new to manufacture mats and carpets having an elastic foundation, composed of caoutchouc or its compounds.

Having thus described my invention, I claim as new and desire to secure by these Letters Patent—

A mat having a foundation of caoutchouc, or a compound thereof, and wearing-surfaces, one or both of which are composed of numerous pieces of textile fabric, arranged with relation to each other after the manner of inlaying, and united to the foundation by vulcanization, substantially as described.

ISAAC F. WILLIAMS.

Witnesses:
BENJAMAN L. WEST,
CHARLES H. WHEDON.